US008547582B2

(12) United States Patent
Noecker, Jr. et al.

(10) Patent No.: US 8,547,582 B2
(45) Date of Patent: *Oct. 1, 2013

(54) PRINT JOB MANAGEMENT BASED ON ENERGY PRICING AND LOAD

(75) Inventors: Nicholas James Noecker, Jr., Houston, TX (US); Julio Eloy Ruano, Round Rock, TX (US); Javier Ricardo Torres, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/414,532

(22) Filed: Mar. 7, 2012

(65) Prior Publication Data

US 2012/0162696 A1      Jun. 28, 2012

Related U.S. Application Data

(63) Continuation of application No. 12/555,042, filed on Sep. 8, 2009.

(51) Int. Cl.
*G06F 3/12* (2006.01)

(52) U.S. Cl.
USPC ....... 358/1.15; 358/1.13; 358/1.14; 358/1.16; 700/291; 700/295; 700/296

(58) Field of Classification Search
USPC ............... 358/1.13, 1.15, 1.16, 1.14; 710/15, 710/62; 718/100, 102; 700/291, 295, 296
See application file for complete search history.

(56) References Cited

U.S. PATENT DOCUMENTS

| 6,795,829 | B2 | 9/2004 | Alsop et al. ................... 707/102 |
| 6,983,188 | B2 | 1/2006 | Loughran et al. ............... 700/99 |
| 7,265,866 | B2 * | 9/2007 | Holmstead et al. .......... 358/1.16 |
| 2008/0291489 | A1 * | 11/2008 | Takahashi et al. ........... 358/1.15 |
| 2009/0326728 | A1 * | 12/2009 | Chrisop et al. ................ 700/295 |
| 2011/0058211 | A1 * | 3/2011 | Noecker et al. .............. 358/1.15 |

FOREIGN PATENT DOCUMENTS

JP           2006171991 A      6/2006

* cited by examiner

*Primary Examiner* — Vu B Hang

(74) *Attorney, Agent, or Firm* — VanLeeuwen & VanLeeuwen; Jeffrey S. LaBaw

(57) ABSTRACT

An approach is provided that prints print jobs based on energy demand data. The print job manager, which is a software application running on an information handling system receives a print request, the print request including a print job. The print job manager retrieves energy demand data. The energy demand data corresponds to a power grid that is a power source for a printer accessible from the information handling system. If the energy demand data indicates a a non-elevated energy demand, then the print job is printed on the printer. On the other hand, if the energy demand data indicates an elevated energy demand, then the print request is stored in a storage and the process waits until the energy demand is not elevated, at which time the print job is printed on the printer.

15 Claims, 5 Drawing Sheets ion, which is defined by the claims that follow the descrip-
PRINT JOB MANAGEMENT BASED ON ENERGY PRICING AND LOAD

RELATED APPLICATION

This application is a continuation of U.S. application Ser. No. 12/555,042, filed Sep. 8, 2009, titled "Print Job Management Based on Energy Pricing and Load," and having the same inventors as the above-referenced application.

BACKGROUND OF THE INVENTION

1. Technical Field

The present invention relates to managing print jobs. More particularly, the present invention relates to scheduling print jobs in light of energy pricing and energy loads that take place during a period of time.

2. Description of the Related Art

Print job management does not typically take external factors or data into account when determining how or when the jobs submitted to a printer should actually be printed. This is especially true in terms of the amount of energy a printer consumes and when it consumes it. Printers are at times non-critical devices that draw a significant amount of energy from the power grid. Users often send jobs to the printer at any time of the day even though the printouts will not be needed at the time they are sent. In fact, sometimes users wait for extended periods before even picking up printouts that are waiting for them. This current unmanaged approach to printing, is not an efficient use of the energy resources consumed by the printer. The lack of energy knowledge at the print job manager is a challenge for energy companies, since they will incur unnecessary load at peak times, and is also a challenge for consumers, since they end up paying for higher peak energy for non-critical jobs. These challenges are exacerbated by the fact that millions of printers are used in office and home settings during standard work hours which is usually the time of greatest energy demands, especially in warmer climates where such homes and office environments are simultaneously using large amounts of energy to operate air conditioning equipment.

SUMMARY

An approach is provided that prints print jobs based on energy demand data. The print job manager, which is a software application running on an information handling system receives a print request, the print request including a print job. The print job manager retrieves energy demand data. The energy demand data corresponds to a power grid that is a power source for a printer accessible from the information handling system. If the energy demand data indicates a a non-elevated energy demand, then the print job is printed on the printer. On the other hand, if the energy demand data indicates an elevated energy demand, then the print request is stored in a storage and the process waits until the energy demand is not elevated, at which time the print job is printed on the printer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
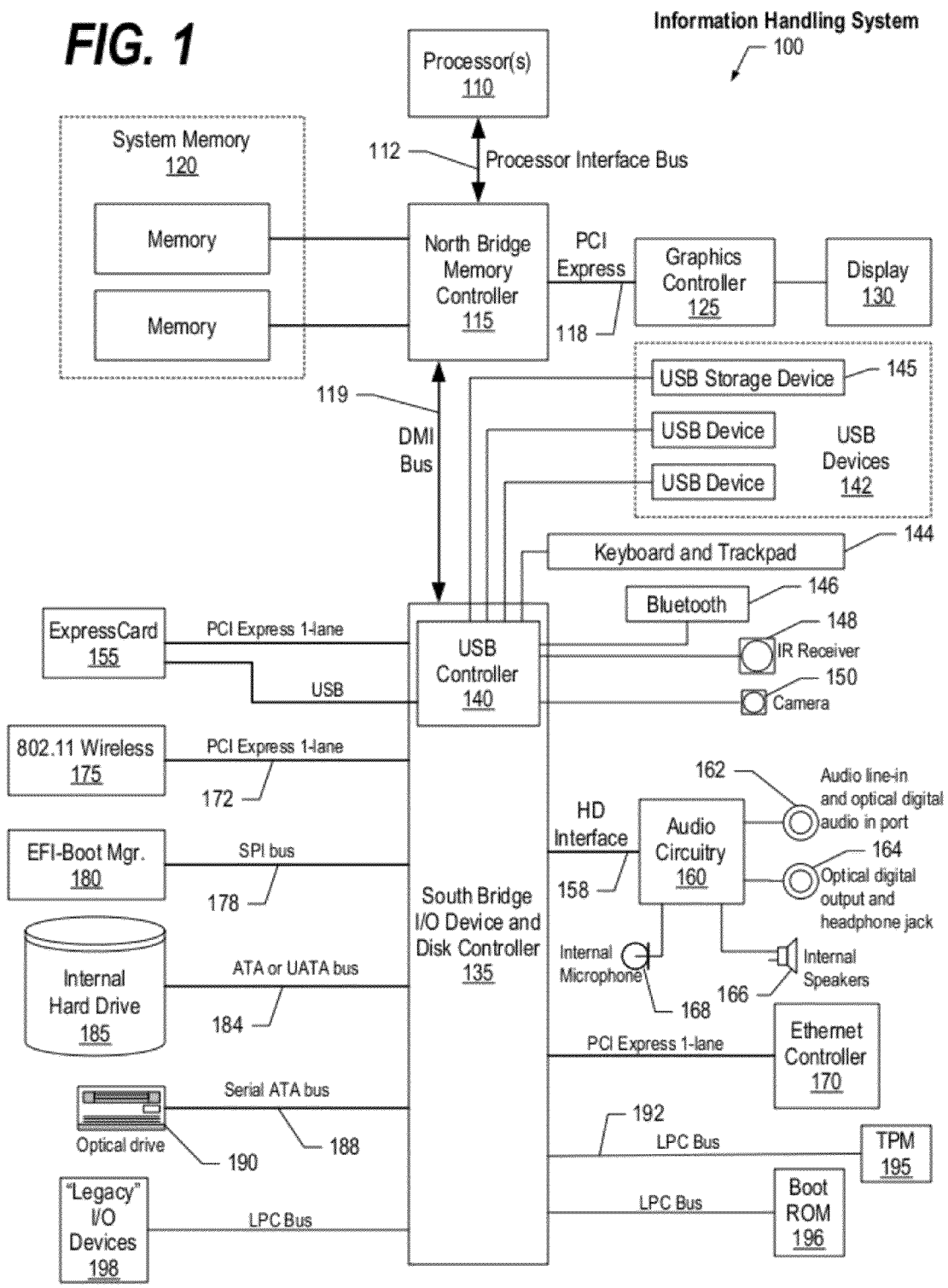
FIG. 1 is a block diagram of a data processing system in which the methods described herein can be implemented.
Figure 2:
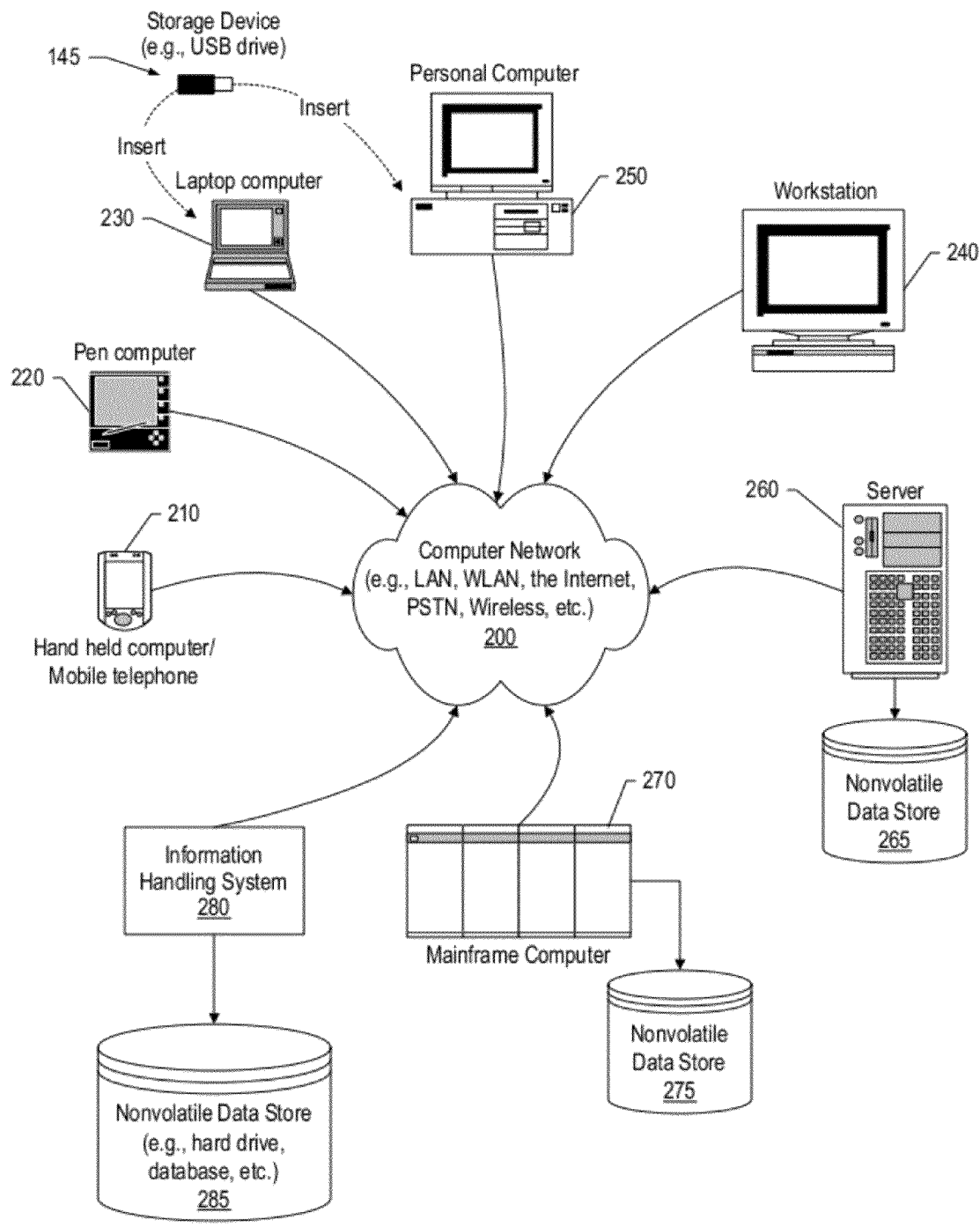
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
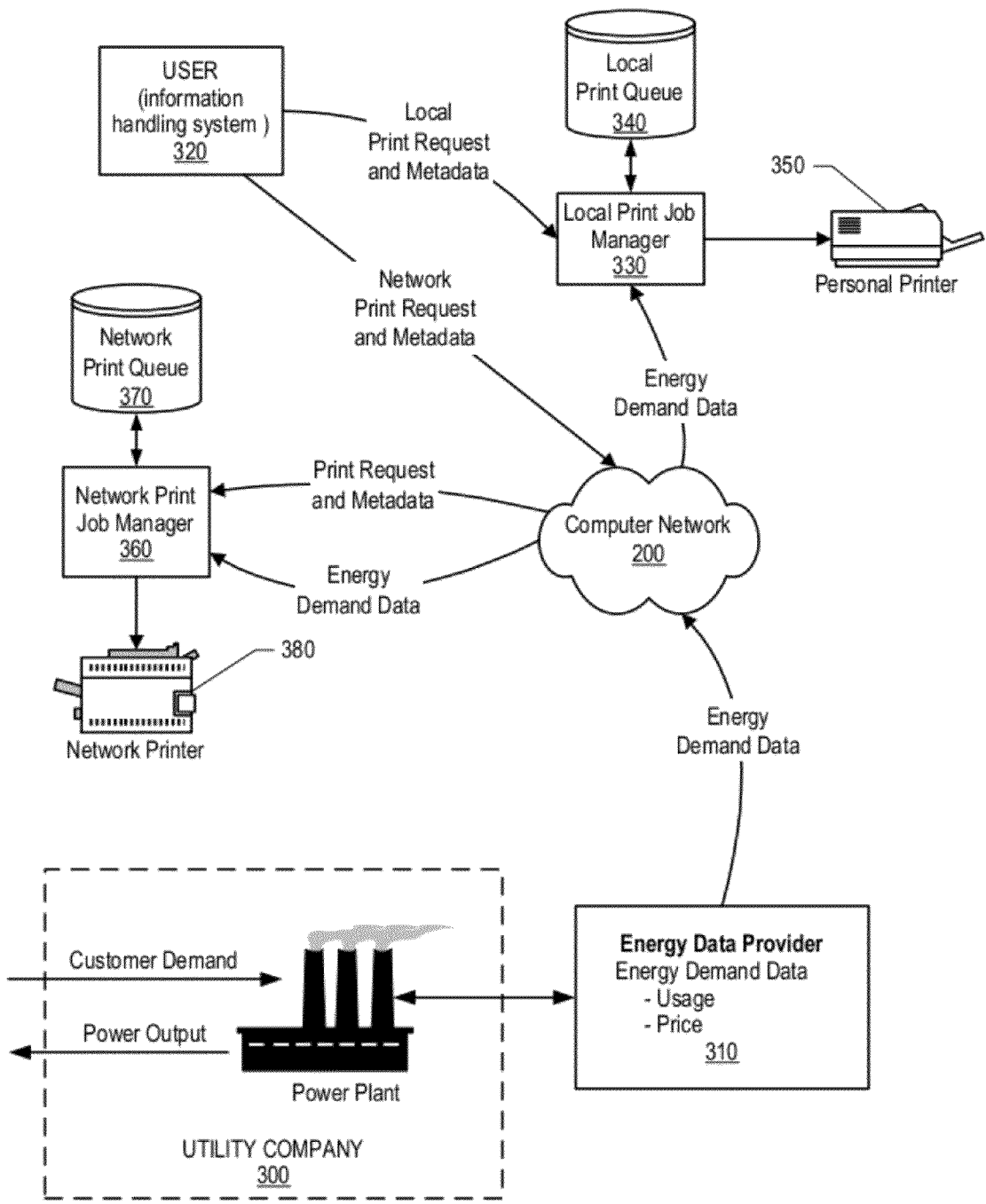
FIG. 3 is a diagram showing the interaction between components in providing print management based on energy factors.

FIG. 3 is a diagram showing the interaction between components in providing print management based on energy factors. Energy provider, such as utility company 300, provide electrical power to consumers, including the power used by user 320 to operate personal printer 350 and network printer 380. During peak energy usage when energy demand is high, the utility company will often charge a higher rate for the power consumed. This is in part a measure to attempt to drive down demand by encouraging power users to use less power. Energy data provider 310, which may be performed by utility company 300 or by a separate service, provides energy demand data to users through computer network 200, such as the Internet. As shown, energy demand data includes factors such as the current amount of power being used and the price that is currently being charged for electricity.

Energy demand data is sent through computer network 200 where it is received by local print job manager 330 and network print job manager 360. User 320, such as an information handling system that uses printing services, sends local print requests and associated metadata to local print job manager 330 when printing to local "personal" printer 350. Likewise, user 320 sends a network print request and metadata through computer network, such as a local area network (LAN), where it is received by network print job manager 360 when printing to network printer 380. As shown, the print request includes metadata such as the print job priority value and the print job which is the data that is actually being printed (often formatted in a language that is understood by the various printers).

When printing to local print job manager 330, the local print job manager stores the print request (including the metadata) in local print queue 340. The local print job manager then retrieves the energy demand data to determine whether to print the print job now or to wait until energy demand is lower. Local print job manager may periodically receive energy demand data from energy data provider 310 and store the energy demand data in a memory area accessible to the print job manager. Periodically, such as every five minutes, every hour, etc., the local print manager receives updated energy demand data from energy data provider 310 and stores the updated energy demand data in the memory area. In one embodiment, the print job manager waits until energy demand is non-elevated before printing documents. In this embodiment, while energy demand is elevated, new print requests that arrive at local print job manager 330 are stored in local print queue 340. When the energy demand is no longer elevated, then the stored print requests (stored print jobs) are retrieved from local print queue 340 and printed on local printer 350. In a further embodiment, user 320 can assign a priority to the print requests. In this embodiment, print requests that are important (e.g., requests with a high print job priority value) are printed regardless of the energy demand data (e.g., even when the energy demand is elevated). Less important print requests are queued in local print queue 340 until such time as the energy demand is not elevated, at which time the print jobs are retrieved from local print queue 340 and sent to local printer 350.

Network print job manager performs similarly to local print job manager as described above. Here, network print job manager 360 receives print requests from a variety of users, including user 320, and these requests are queued in network print queue 370. Similar to the local print job manager, network print job manager 360 may periodically receive energy demand data from energy data provider 310 and store the energy demand data in a memory area accessible to the network print job manager. Again, periodically, the network print manager receives updated energy demand data from energy data provider 310 and stores the updated energy demand data in the network print job manager's memory area. In one embodiment, the network print job manager waits until energy demand is non-elevated before printing documents. In this embodiment, while energy demand is elevated, new print requests that arrive at network print job manager 360 are stored in network print queue 370. When the energy demand is no longer elevated, then the stored print requests (stored print jobs) are retrieved from network print queue 370 and printed on network printer 380. As previously described, in a further embodiment user 320 can assign a priority to the print requests. In this embodiment, important print requests (e.g., requests with a high print job priority value) are printed regardless of the energy demand data, even when the energy demand is elevated. Less important print requests are stored in network print queue 370 until such time as the energy demand is not elevated, at which time the print jobs are retrieved from network print queue 370 and sent to network printer 380.

Figure 4:
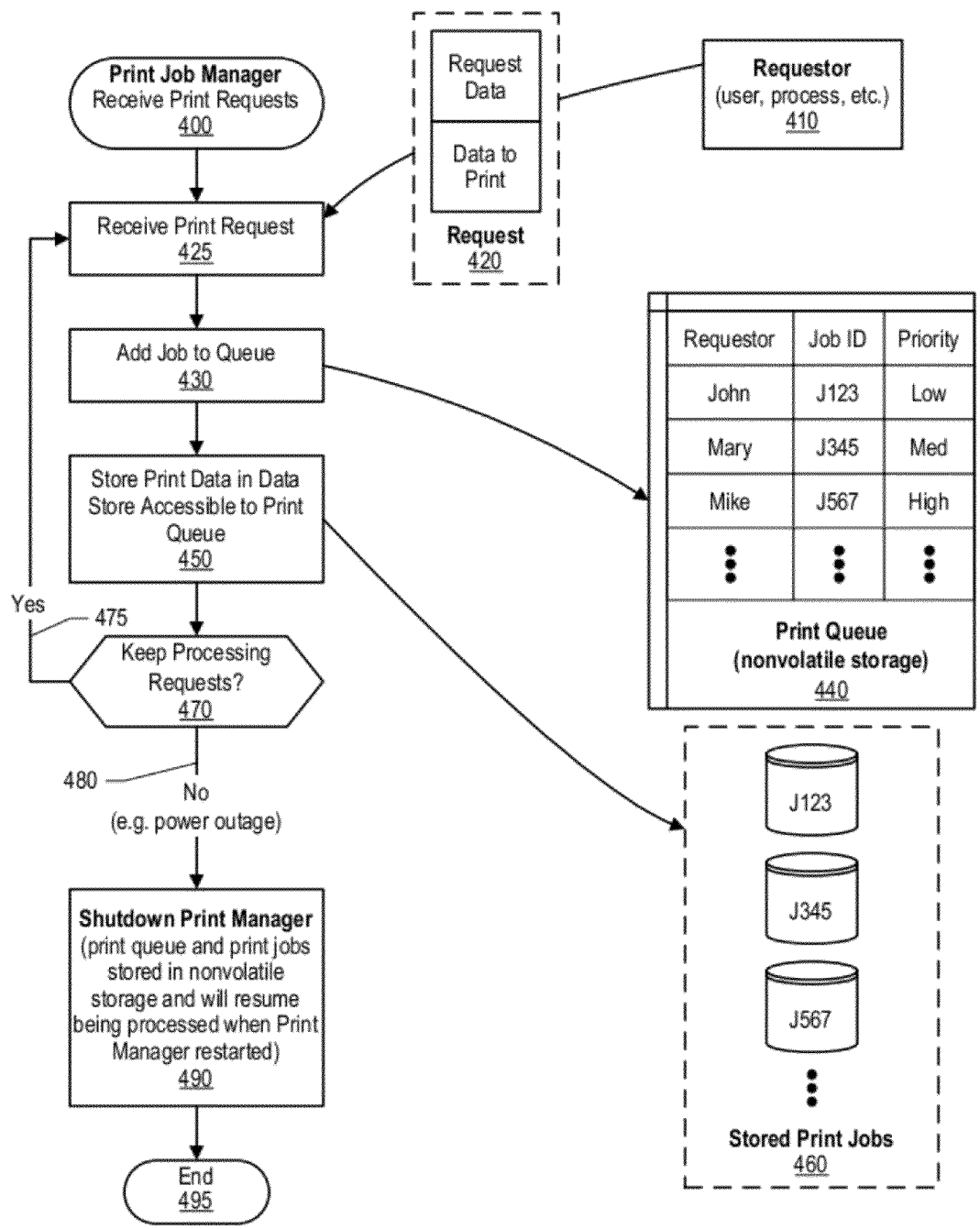
FIG. 4 is a flowchart showing steps taken by the print job manager to receive and store print requests in the print queue for completion based on energy factors, as shown in FIG. 5.
Figure 5:
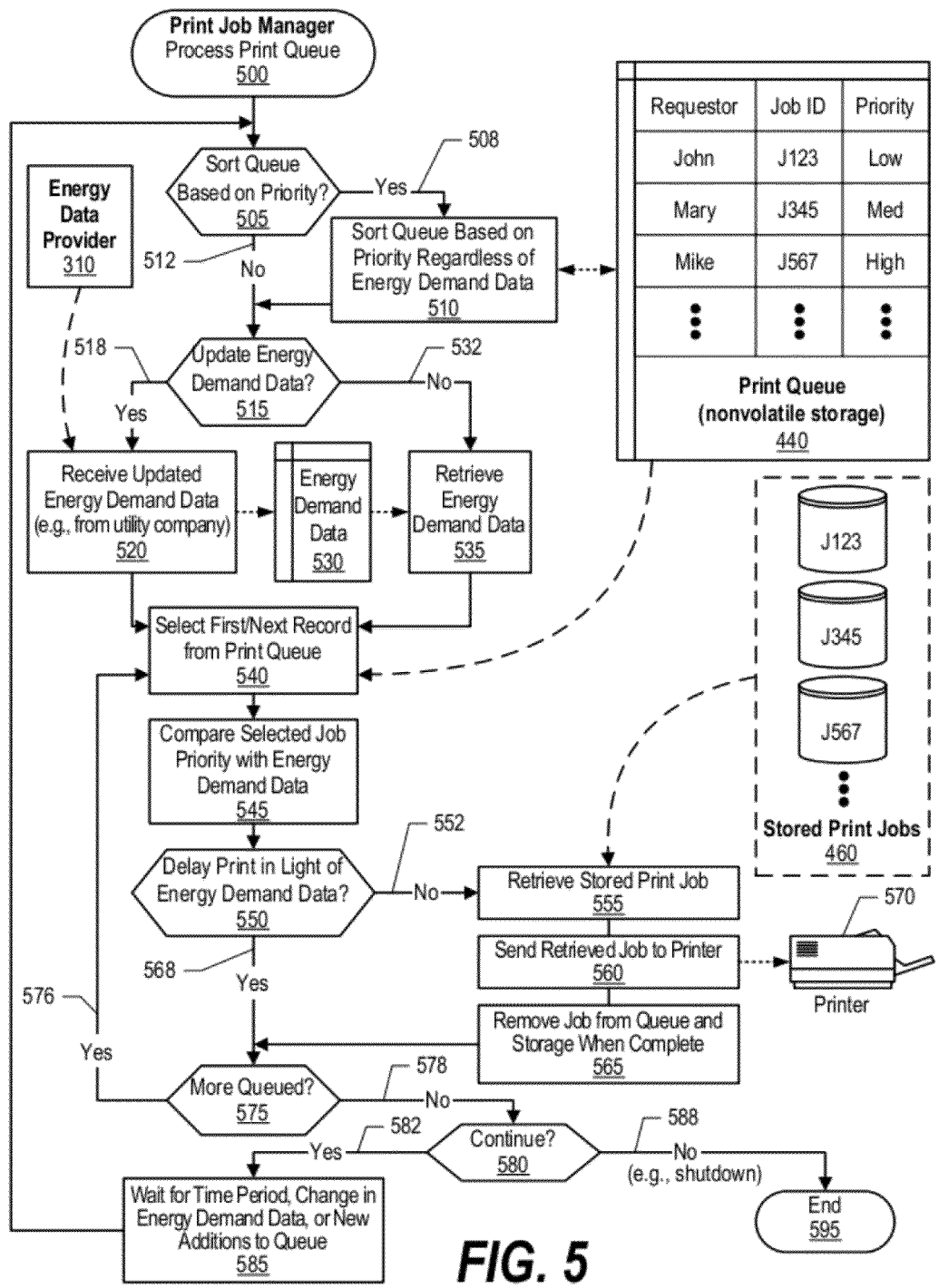
FIG. 5 is a flowchart showing steps taken by print job manager to process the print queue based on energy analysis data.

FIG. 4 is a flowchart showing steps taken by the print job manager to receive and store print requests in the print queue for completion based on energy factors, as shown in FIG. 5. Print job manager processing used to receive print requests commences at 400 whereupon, at step 425, print request 420 is received from requestor 410. As shown, print request 420 includes request data, such as the identifier or username used by the requestor and the priority of the print request as well as the print job which is the data (often formatted using a printer-control language) that the requestor wishes to print.

At step 430, the print request is added to print queue 440. In one embodiment, print queue 440 is maintained in a nonvolatile storage area, such as on a hard drive or in a nonvolatile memory. The print queue includes the identifier of the requestor, a print job identifier that is assigned to the print job by the print job manager, and the print job priority value assigned to the print job. As shown, multiple print requests are stored in print queue 440.

At step 450, the print jobs (the data to be printed) are stored in storage area 460, such as a nonvolatile storage area, while waiting to be printed. In the embodiment shown, the stored print jobs are identified using the unique job identifiers that were assigned by the print job manager. Note that each stored print job in storage area 460 corresponds to one of the entries in print queue 440.

A determination is made as to whether keep processing new requests that arrive at the print job manager (decision 470). If the print job manager process is continuing, then decision 470 branches to "yes" branch 475 which loops back to receive the next print request from a requestor. This looping continues until processing halts (e.g., during a power outage or when the computer system is powered off), at which point decision 470 branches to "no" branch 480 whereupon, at step 490, the print manager is shutdown. Note that in an embodiment using nonvolatile storage to store print queue 440 and stored print jobs 460, processing and printing of these stored print jobs will continue once processing resumes (e.g., when power restored, etc.).

FIG. 5 is a flowchart showing steps taken by print job manager to process the print queue based on energy analysis data. Processing commences at 500 whereupon a determination is made as to whether print queue 440 should be sorted based the print job priority value (decision 505). If the print queue is sorted based on the print job priority value, then decision 505 branches to "yes" branch 508 whereupon, at step 510, print queue 440 is sorted based on the print job priority value. In one embodiment, this sorting is performed regardless of the energy demand data. In other words, if a high priority print job is in the queue it will print before a lower priority print job even if the energy demand data does not indicate an elevated energy demand, as discussed below. Note that print queue 440 that is being processed by the steps shown in FIG. 5 is loaded with print requests by the steps previously shown in FIG. 4.

Returning to FIG. 5, if the print queue is not sorted based upon priority, then decision 505 branches to "no" branch 512 bypassing step 510. Another determination is made as to whether it is time to update the energy demand data (decision 515). Energy demand data is initially received (e.g., when processing commences) and is then periodically updated as deemed necessary (e.g., every five minutes, every hour, etc.). In this manner, near-current energy demand data can be used to determine whether to delay printing various print jobs. If it is time to update the energy demand data, then decision 515 branches to "yes" branch 518 whereupon, at step 520, the energy demand data is received from energy data provider 310, such as the utility company from which electricity is purchased. The updated energy demand data is stored in energy demand data memory area 530. Returning to decision 515, if it is not time to update the energy demand data, then decision 515 branches to "no" branch 532 whereupon, at step 535 the last energy demand data that was received from the energy data provider is retrieved.

At step 540, the first record is selected from print queue 440 (the print queue may have previously been sorted at step 510, as described above). At step 545, the print job manager compares the priority of the selected record with the near-current energy demand data. A determination is then made as to whether to delay printing the print job corresponding to the selected record based on the comparison (decision 550). For example, if the priority is "high" then the print job manager may be set up to always print out the print job regardless of the current energy demand, while the same print job manager may wait until energy demand is low before printing "low" priority print jobs. Likewise, the print job manager may be configured to print "medium" priority print jobs at any time so long as the energy demand is lower than "high."

If the determination is to not delay the print job, then decision 550 branches to "no" branch 552 whereupon, at step 555, the stored print job corresponding to the selected record is retrieved from nonvolatile storage area 460. At step 560, the retrieved job is sent to printer 570 for printing. When the job has been printed, the record is removed from print queue 440 and the corresponding print job is removed from nonvolatile data area 460 at step 565. Returning to decision 550, if the determination is to delay printing the selected print job, then decision 550 branches to "yes" branch 568 bypassing steps 555 to 565 and leaving the selected record in the print queue and also leaving the corresponding print job in nonvolatile storage area 460.

A determination is made as to whether print manager processing continues (decision 580). If the print manager terminates (e.g., during a power outage or when the computer system is powered off), then decision 580 branches to "no" branch 588 and processing ends at 595. On the other hand, if processing continues, then decision 580 branches to "yes" branch 582 whereupon, at step 585, the print manager waits for an event to occur before looping back to continue processing. In one embodiment, processing sets a future print time for the print job that is a known time of lower energy demand. The event can be a period of time (e.g., when the energy demand data is updated), a signal to the print job manager that energy demand data has changed, or when one or more new additions have been added to print queue 440 using the steps shown in FIG. 4. When an event occurs, then processing loops back to process the queue.

A determination is made as to whether print manager processing continues (decision 580). If the print manager terminates (e.g., during a power outage or when the computer system is powered off), then decision 580 branches to "no" branch 588 and processing ends at 595. On the other hand, if processing continues, then decision 580 branches to "yes" branch 582 whereupon, at step 585, the print manager waits for an event to occur before looping back to continue processing. The event can be a period of time (e.g., when the energy demand data is updated), a signal to the print job manager that energy demand data has changed, or when one or more new additions have been added to print queue 440 using the steps shown in FIG. 4. When an event occurs, then processing loops back to process the queue.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method executing on an information handling system comprising:
    receiving a print request at a print job manager application running on the information handling system, the print request including a print job and a priority value;
    extracting the priority value from the received print request;

retrieving energy demand data, wherein the energy demand data corresponds to a power grid that is a power source for a printer accessible from the information handling system;

determining whether to delay printing the print job based upon comparing the extracted priority value with the energy demand data;

in response to determining to print the print job without delay, printing the print job on the printer; and in response to determining to delay printing the print job:
  storing the print request in a storage area accessible to the information handling system;
  setting a future print time for the print job, wherein the future print time is a known time of lower energy demand;
  retrieving the print job from the nonvolatile storage area at a time corresponding to the future print time; and
  printing the retrieved print job on the printer.

2. The method of claim 1 wherein the print request is included in a plurality of print requests that each include a corresponding priority value, the method further comprising:
  storing the plurality of print requests in the storage area;
  comparing each of the plurality of print requests' corresponding priority values to the energy demand data;
  identifying a first set of print requests included in the plurality of print requests to be printed without delay based on the comparison of each of the plurality of print requests' corresponding priority values to the energy demand data; and
  identifying a second set of print requests included in the plurality of print requests to delay printing based upon the comparison of each of the plurality of print requests' corresponding priority values to the energy demand data.

3. The method of claim 2 further comprising:
  sorting the received plurality of print requests based upon the priority value of the corresponding print requests.

4. The method of claim 1 further comprising:
  receiving the energy demand data from an energy data provider over a computer network.

5. The method of claim 1 wherein the storage area is a nonvolatile storage area and the method further comprises:
  after receiving the print request, storing the print request on the nonvolatile storage area; and
  when the print job is printed, deleting the print request from the nonvolatile storage.

6. A method executing on an information handling system comprising:
  receiving a print request at a print job manager application running on the information handling system, the print request including a print job and a priority value;
  extracting the priority value from the received print request;
  determining whether to delay printing the print job based upon comparing the priority value with a current energy demand level;
  storing the print job in a storage area in response to determining to delay the print job; and
  printing the print job on a printer in response to determining to not delay the print job.

7. The method of claim 6 further comprising:
  receiving a plurality of print requests, including the print request, each of the print requests including a print job priority value and print job;
  storing the plurality of print requests in the storage area;
  comparing the plurality of print job priority values to the energy demand data;
  identifying a first set of print requests included in the plurality of print requests to be printed without delay based on the comparison; and
  identifying a second set of print requests included in the plurality of print requests to delay printing based upon the comparison.

8. The method of claim 7 further comprising:
  sorting the received plurality of print requests, prior to the comparison, based upon the print job priority value of the corresponding print requests.

9. The method of claim 6 further comprising:
  receiving the energy demand data from an energy data provider over a computer network.

10. The method of claim 6 wherein the storage area is a nonvolatile storage area and the method further comprises:
  after receiving the print request, storing the print request on the nonvolatile storage area; and
  when the print job is printed, deleting the print request from the nonvolatile storage.

11. A method executing on an information handling system comprising:
  receiving a print request at a print job manager application running on the information handling system, the print request including a print job and a priority value;
  retrieving energy demand data, wherein the energy demand data corresponds to a power grid that is a power source for a printer accessible from the information handling system;
  extracting the priority value from the received print request;
  comparing the priority value with a current energy demand level included in the energy demand data;
  in response to the comparison indicating the priority value is higher than the energy demand level:
    printing the print job on the printer; and
  in response to the comparison indicating the priority value is lower than the energy demand data:
    storing the print request in a storage area accessible to the information handling system;
    setting a future print time for the print job, wherein the future print time is a known time of a lower energy demand level;
    retrieving the print job from the nonvolatile storage area at a time corresponding to the future print time; and
    printing the retrieved print job on the printer.

12. The method of claim 11 further comprising:
  receiving a plurality of print requests, including the print request, each of the print requests including a print job priority value and print job;
  storing the plurality of print requests in the storage area;
  comparing the plurality of print job priority values to the energy demand data;
  identifying a first set of print requests included in the plurality of print requests to be printed without delay based on the comparison; and
  identifying a second set of print requests included in the plurality of print requests to delay printing based upon the comparison.

13. The method of claim 12 further comprising:
  sorting the received plurality of print requests, prior to the comparison, based upon the print job priority value of the corresponding print requests.

14. The method of claim 11 further comprising:
  receiving the energy demand data from an energy data provider over a computer network.

15. The method of claim 11 wherein the storage area is a nonvolatile storage area and the method further comprises:

after receiving the print request, storing the print request on the nonvolatile storage area; and when the print job is printed, deleting the print request from the nonvolatile storage.

* * * * *